United States Patent [19]

Tsukahara et al.

[11] Patent Number: 5,014,201

[45] Date of Patent: May 7, 1991

[54] AUTOMATIC CAR-SPEED CONTROLLER WITH DETECTION OF ABNORMALITY OF THE ELECTROMAGNETIC CLUTCH

[75] Inventors: Akihiko Tsukahara; Toshio Iwaoka; Yuichi Yamaguchi; Tsutomu Danzaki, all of Yokohama, Japan

[73] Assignee: Jidosha Denki Kogyo K.K., Kanagawa, Japan

[21] Appl. No.: 470,661

[22] Filed: Jan. 26, 1990

[30] Foreign Application Priority Data

Jan. 27, 1989 [JP] Japan .................................. 1-19233

[51] Int. Cl.⁵ ...................... G06F 7/70; F02D 31/00; B60K 31/00; B60K 31/14
[52] U.S. Cl. ..................... 364/426.04; 364/424.05; 318/434; 123/352; 123/361; 180/170; 180/174
[58] Field of Search ................. 364/424.05, 426.04, 364/426.05, 565, 431.07; 180/170, 174, 178, 179; 123/349, 352, 361; 318/626, 434

[56] References Cited

U.S. PATENT DOCUMENTS 4,656,407 4/1987 Burney ............................ 318/626
4,766,971 8/1988 Hyodo .............................. 180/178
4,823,902 4/1989 Onishi et al. ...................... 180/170
4,850,250 7/1989 Nehmer et al. ................ 180/179 X
4,885,692 12/1989 Kurihara et al. ............... 364/426.04
4,921,063 5/1990 Masuda ............................ 180/178

FOREIGN PATENT DOCUMENTS 61-287830 12/1986 Japan .

Primary Examiner—Parshotam S. Lall
Assistant Examiner—E. J. Pipala
Attorney, Agent, or Firm—Sughrue, Mion, Zinn, Macpeak & Seas

[57] ABSTRACT

An automatic car-speed controller is provided with a car-speed sensor, a command switch, a car-speed memory, an actuator, a driving motor, an abnormality detector for detecting an abnormality in an electromagnetic clutch of the actuator by detecting the time required for returning a throttle to the fully closed position from the position at which the electromagnetic clutch is released, and a control system for making the actuator inoperative when the abnormality detector detects an abnormality in the electromagnetic clutch.

4 Claims, 3 Drawing Sheets

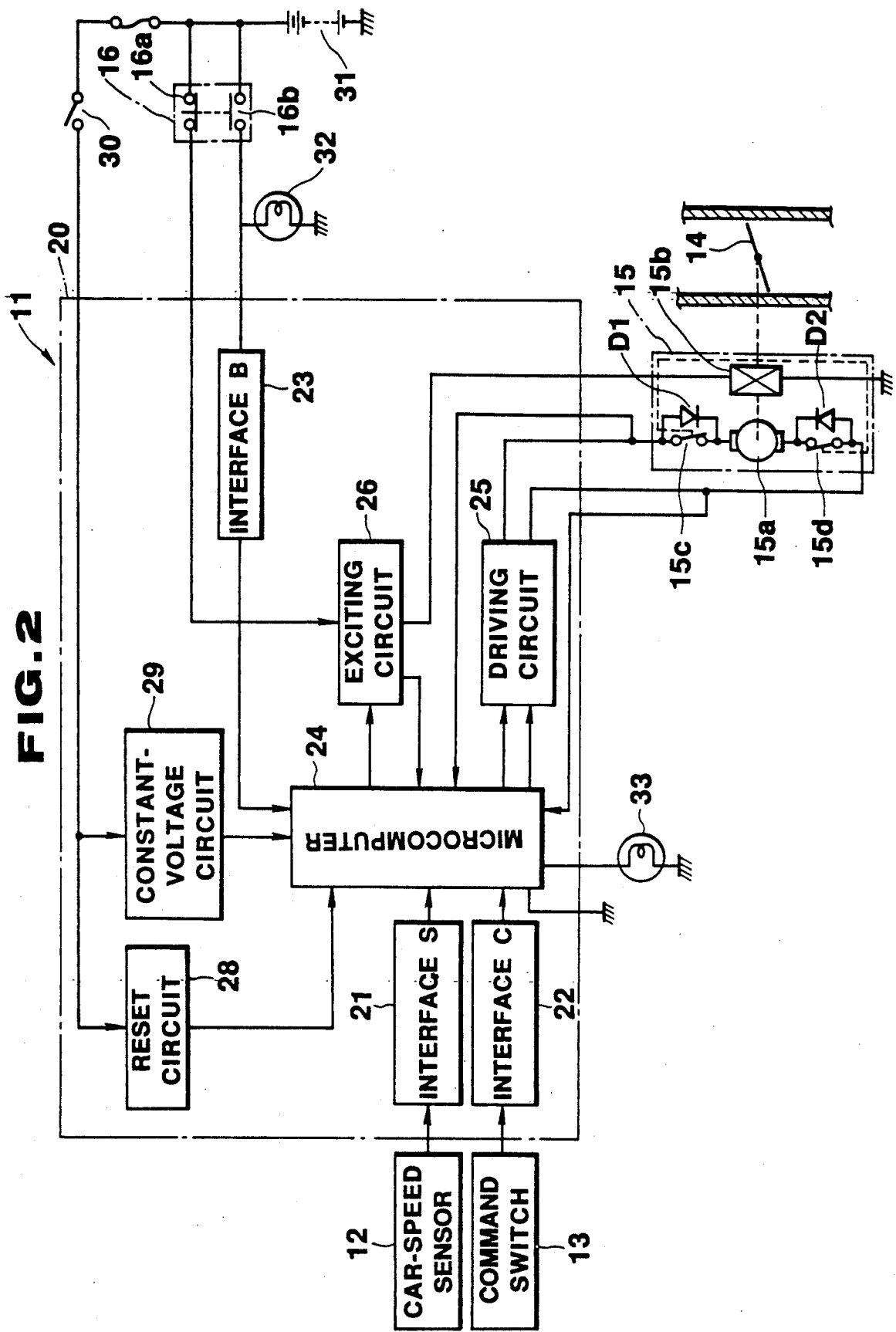

AUTOMATIC CAR-SPEED CONTROLLER WITH DETECTION OF ABNORMALITY OF THE ELECTROMAGNETIC CLUTCH

BACKGROUND OF THE INVENTION

1. Field Of The Invention

This invention relates to an automatic car-speed controller used for controlling the traveling speed of a car at a set point automatically.

2. Description Of The Prior Art

Heretofore, there have been many types of such automatic car-speed controllers. Among them, there has been an automatic car-speed controller disclosed in Japanese Patent Disclosure (Kokai) No. 61-287830/86, for example.

Said automatic car-speed controller has a construction comprising a car-speed sensor for outputting operating data proportional to an actual car-speed, a command switch for outputting a cruise command signal, a car-speed memorizing means for memorizing the operating data from said car-speed sensor in response to an operation of said command switch, a motor driven actuator for opening and closing a throttle by rotation of a driving motor through an electromagnetic clutch, a driving circuit for rotating the driving motor of said actuator in the forward and reverse directions, and a control means for giving a command to said driving circuit corresponding to a difference between actual car-speed and memorized car-speed in a state in which the electromagnetic clutch is excited at the time of an automatic car-speed control and for making the electromagnetic clutch into a deenergized state after rotating the driving motor to the full-closed position of the throttle at the time of cancelling the automatic car-speed control.

In said automatic car-speed controller, the memorizing means memorizes the car-speed at the time of OFF-operation by setting of a setting switch of the command switch subsequent to the ON-operation of the setting switch, the control means makes the electromagnetic clutch of the actuator into the excited state and gives the command to the driving circuit corresponding to the difference between actual car-speed and memorized car-speed. According to the command from said control means the driving circuit opens or closes the throttle by rotating the driving motor of the actuator, thereby the actual car-speed is controlled to the memorized car-speed so as to travel at a constant speed. When the automatic car-speed control is canceled by working a brake pedal or the like, the control means makes the electromagnetic clutch into a deenergized state after rotating the driving motor to the full-closed position of the throttle, said throttle is returned to the full-closed position at all times by the rotation of the driving motor through the electro magnetic clutch.

However, in the conventional automatic car-speed controller described above, because the electromagnetic clutch is always made into unexcited state after returning the driving motor of the actuator to the full-closed position of the throttle at the time of cancelling the automatic car-speed control in order to make sure of safety of the system from troubles in the electromagnetic clutch whether the electromagnetic clutch of the actuator is normal or not, the time is required in some measure for returning the driving motor to the full-closed position of the throttle. Thus, there is a problem since it is impossible to cancel rapidly the automatic car-speed control. There is another problem in that it is not improbable that the automatic car-speed controller is operated at a state in which the electromagnetic clutch breaks down.

SUMMARY OF THE INVENTION

The present invention is made in view of the aforementioned problems of the prior art, it is an object to provide an automatic car-speed controller which is capable of cancelling rapidly the actuator at the time of cancelling the automatic car-speed control and possible to improve the reliability of the system.

The construction of the automatic car-speed controller according to this invention will be explained on basis of the functional block diagram shown in FIG. 1. Namely, the construction of the automatic car-speed controller according to this invention for solving the above mentioned problems is characterized by having a car-speed sensor 1 for outputting operating data proportional to an actual car-speed, a command switch 2 for outputting a cruise command signal, a car-speed memorizing means 3 for memorizing the operating data of said car-speed sensor 1 in response to an operation of said command switch 2, an actuator 4 for opening and closing a throttle 5 by rotation of a driving motor 4b through electromagnetic clutch 4a and for stopping said driving motor 4b when a limit switch 4c senses said throttle 5 in the full-opened position or the full-closed position, a driving means 6 for rotating the driving motor 4b of said actuator 4 in the forward and reverse directions, an abnormal detection means 7 for making said electromagnetic clutch 4a into unexcited state and returning said driving motor 4b of the actuator 4 to the full-closed position of the throttle 5 at the time of cancelling an automatic car-speed control and for detecting whether said electromagnetic clutch 4a is normal or not by detecting the time required for returning said throttle 5 to the full-closed position using said limit switch 4c to sense the throttle 5 in the full-closed position, and a control means 8 for giving a command to said driving means 6 corresponding to a difference between actual car-speed and memorized car-speed and for making said actuator 4 into unoperated state when said abnormal detection means 7 detects abnormality in said electromagnetic clutch 4a.

In the automatic car-speed controller according to this invention having afore-mentioned construction, when the automatic car-speed control is canceled by, for example, working a brake pedal, the abnormal detection means 7 makes the electromagnetic clutch 4a of the actuator 4 into unexcited state and rotates the driving motor 4b in the closing direction of the throttle 5 as shown in FIG. 1. Hereupon, said abnormal detection means 7 senses the throttle 5 in the full-closed position by the limit switch 4c of the actuator 4, and detects whether the electromagnetic clutch 4a is normal or not on the basis of the time required for returning the throttle 5 to the full-closed position from the position in which the electromagnetic clutch 4a is made into unexcited state. In case the abnormal detection means 7 detects that there is a trouble in the electromagnetic clutch 4a the control means 8 makes the actuator 4 inoperative in order to prevent the switching over to the automatic car-speed control.

BRIEF DESCRIPTION OF THE DRAWINGS

FIG. 2 is a diagram illustrating the circuitry of an embodiment of the automatic car-speed controller according to this invention;

DESCRIPTION OF THE PREFERRED EMBODIMENT

This invention will be described below on the basis of the drawings.

Figure 4:
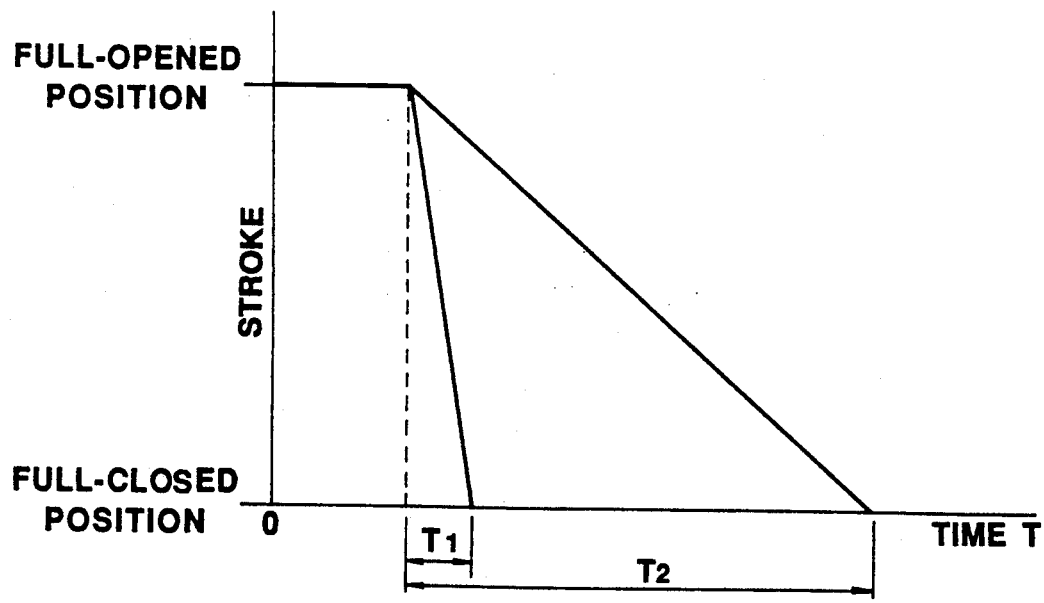
FIG. 4 is a graph showing the relationship between time and stroke of the actuator at the time of cancelling the automatic car-speed control.
Figure 3:
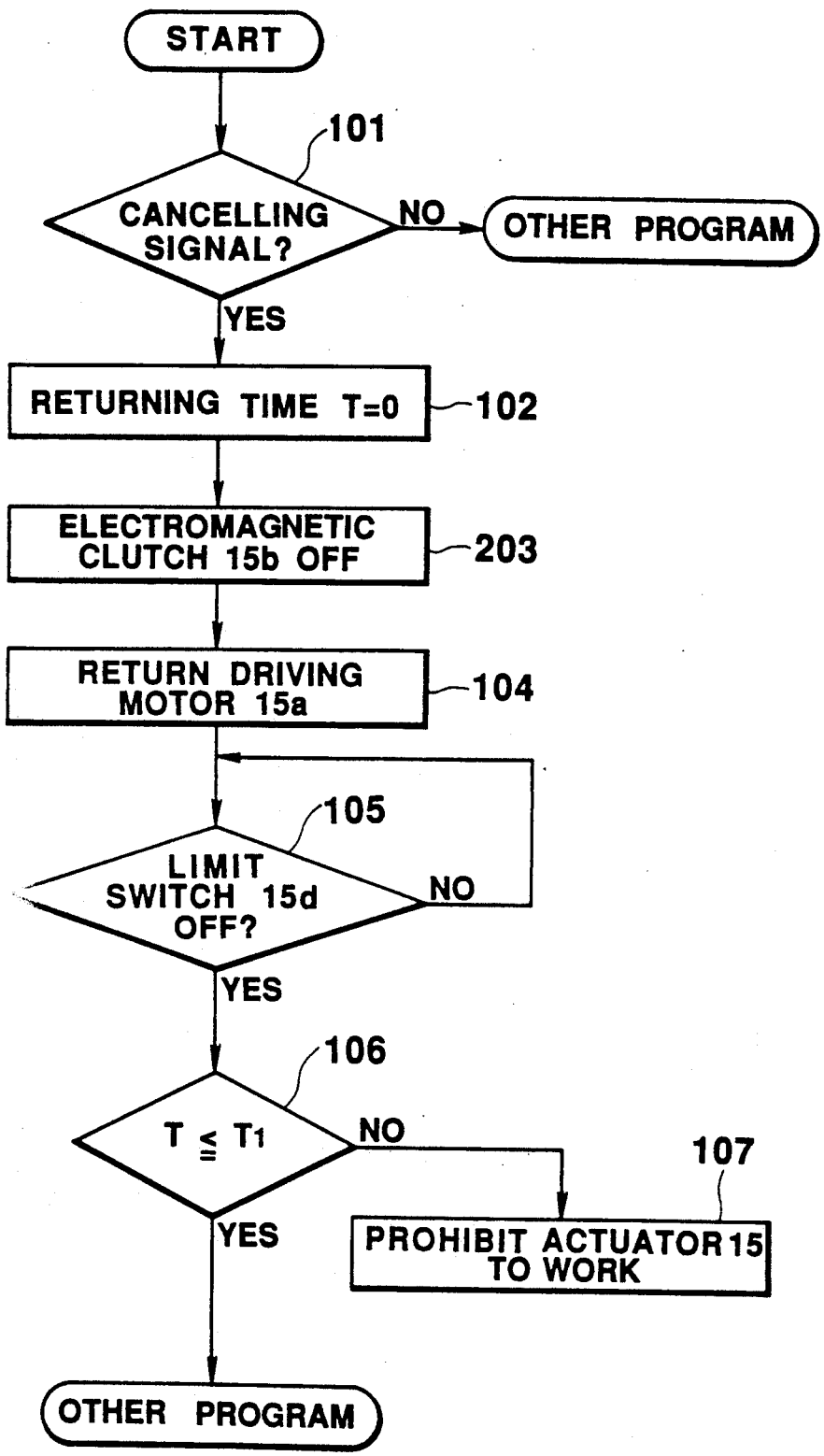
FIG. 3 is a flowchart showing the program housed in the microcomputer in FIG. 2.

FIG. 2 to FIG. 4 are diagrams showing an embodiment of the automatic car-speed controller according to this invention. FIG. 2 is a diagram illustrating the circuitry of the automatic car-speed controller.

Figure 1:
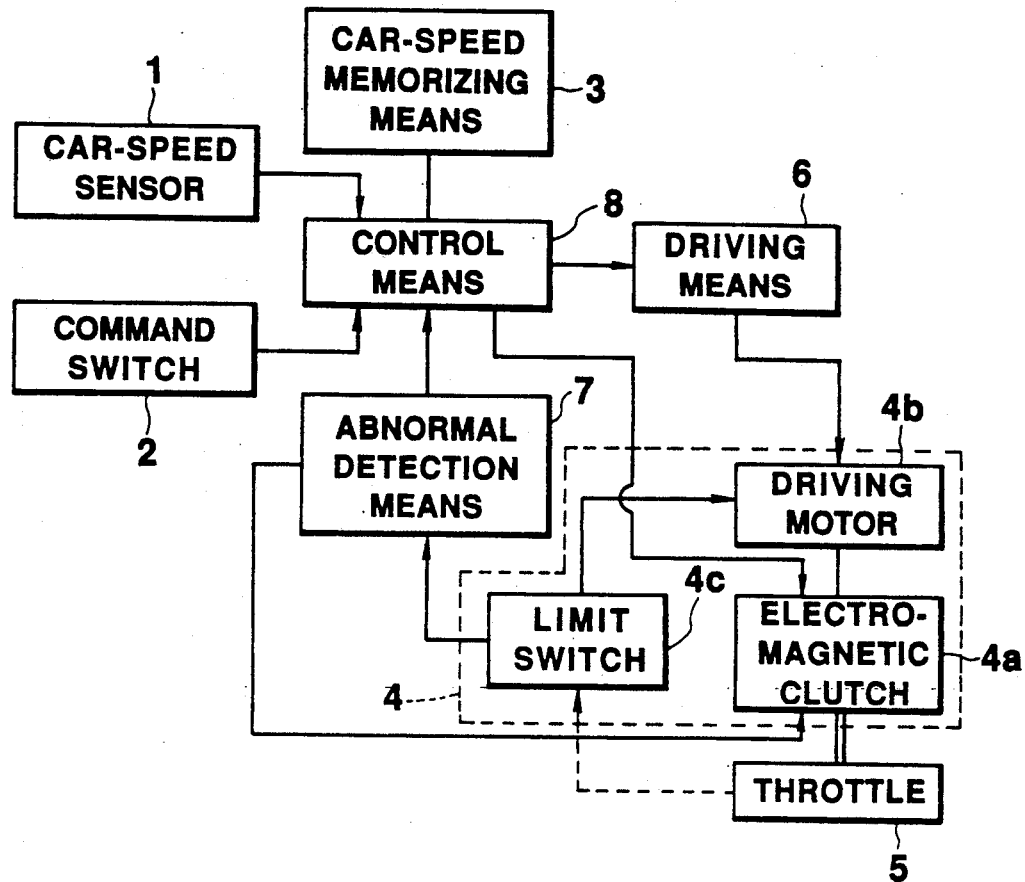
FIG. 1 is a functional block diagram showing the arrangement of an embodiment of the automatic car-speed controller according to this invention.

In FIG. 2, numeral 11 is an automatic car-speed controller. Said automatic car-speed controller 11 has a car-speed sensor 12 (corresponding to the car-speed sensor 1 shown in FIG. 1) for outputting operating data proportional to the actual car-speed, a command switch 13 (corresponding to the command switch 2 shown in FIG. 1) for outputting a cruise command signal, a motor driven actuator 15 (corresponding to the actuator 4 shown in FIG. 1) for driving a throttle 14 (corresponding to the throttle 5 shown in FIG. 1) of a motor vehicle, and a brake switch 16 link to operation of a brake pedal (not shown), and is provided in a control part 20 with a circuit configuration comprising a microcomputer 24 which receives respective operating data from said car-speed sensor 12, the command switch 13 and the brake switch 16 through respective interface circuits 21, 22 and 23, a driving circuit 25 (corresponding to the driving means 6 shown in FIG. 1) for driving a driving motor 15a (will be described later) of the actuator 15 in the opening and closing direciton of the throttle 14 (that is in the forward and reverse rotational direction) by said microcomputer 24, an exciting circuit 26 for performing intermission of an electromagnetic clutch 15b (will be described later) of the actuator 15 by said microcomputer 24, a reset circuit 28 and a constant-voltage circuit 29.

And said automatic car-speed controller 11 is provided in the outside of said control part 20 with a main switch 30, a battery 31 loaded on the vehicle, a brake lamp 32 and a cruise lamp 33. Furthermore, said command switch 13 includes a setting switch, a resuming switch, an accelerating switch and so on.

Said actuator 15 is provided with the driving motor 15a (corresponding to the driving motor 4b shown in FIG. 1) to be driven in the forward and reverse rotational direction by said driving circuit 25, the electromagnetic clutch 15b (corresponding to the electromagnetic clutch 4a shown in FIG. 1) for transmitting the rotation of said driving motor 15a to the throttle 14 through a reduction gear (not shown) by said exciting circuit 26, a limit switch 15c (corresponding to the limit switch 4c shown in FIG. 1) for sensing said throttle 14 arriving in the full-opened position at the corresponding position in said actuator 15, a limit switch 15d (corresponding to the limit switch 4c shown in FIG. 1) for sensing said throttle 14 arriving in the full-closed position at the corresponding position in said actuator 15, a diode D1 for bypassing said limit switch 15c to sense the throttle 14 in the full-opened position, and a diode D2 for bypassing said limit switch 15d to sense the throttle 14 in the full-closed position. Additionally, the throttle 14 is connected with the actuator 15 through a link rod or the like.

Said brake switch 16 has a normally-closed first switch 16a and a normally-opened second switch 16b, and is so structured that the first switch 16a moves into opened state by linking with the operation of the brake pedal (not shown) and outputs a cancelling signal to the exciting circuit 26, and the second switch 16b moves into closed state and outputs a cancelling signal to the microcomputer 24 through the interface circuit 23.

Said microcomputer 24 houses a car-speed memorizing means (corresponding to the car-speed memorizing means 3 shown in FIG. 1) for memorizing the car-speed at the time of OFF-operation of the setting switch of said command switch 13 subsequent to the ON-operation of said setting switch (which may be designed so as to memorize the car-speed at the time of On-operation), an abnormal detection means (corresponding to the abnormal detection means 7 shown in FIG. 1) for making the electromagnetic clutch 15b of said actuator 15 into unexcited state and returning the driving motor 15a to the full-closed position of the throttle 14 at the time of cancelling the automatic car-speed control, and for detecting whether said electromagnetic clutch 15b works normally or not by detecting the time required for returning said throttle 14 to the full-closed position using the limit swtich 15d to sense the throttle 5 in the full-closed position, and a control means (corresponding to the control means 8 shown in FIG. 1) for comparing the memorized car-speed by said car-speed memorizing means with the actual car-speed from the car-speed sensor 12 and controlling the car-speed so as to coincide the actual car-speed with the memorized car-speed by working the driving circuit 25 and the exciting circuit 26 in response to the difference between the car-speeds, and for making said actuator 15 inoperative when the abnormal detection means detects abnormality in said electromagnetic clutch 15b.

Next, the explanation is given on the action of the automatic car-speed controller 11 having the above-mentioned configuration including FIG. 3 and FIG. 4.

First of all the main switch 30 is switched into ON-state in order to operate the automatic car-speed controller 11. Hereupon, the car-speed sensor 12 outputs the pulse signal, that is the operating data proportional to the actual car-speed, to the microcomputer 24 in the control part 20. The pulse signal is sampled for a specified time such that the microcomputer 24 detects the pulse number proportional to the car-speed. In this state, the cruise lamp 33 is lit at the time of cancelling the setting signal subsequent to the input of the setting signal into the control means of the microcomputer 24 by setting the setting switch of the command switch 13, the pulse number according to the car-speed at that time is memorized by the memorizing means in the microcomputer 24. The control means in the microcomputer 24 works the exciting circuit 24 and makes the eletro-magnetic clutch 15b of the actuator 15 into excited state, so that the throttle 14 is enabled to be opened and closed by the rotation of the driving motor 15a.

In this state, the motor driving signal in response to the pulse number memorized in the car-speed memorizing means is output from the control means of said microcomputer 24, the driving circuit 25 rotates the driving motor 15a of the actuator according to said motor driving signal, and so the throttle 14 is maintained in the prescribed position through the electromagnetic clutch 15b and the link rod (not shown). After that, the throttle is maintained in the prescribed position without operating the accelerator pedal, the motor vehicle can travel at a constant traveling speed.

Hereupon, the control means of the microcomputer 24 compares the pulse number proportional to the actual car-speed from the car-speed sensor 12 with the pulse number memorized by the car-speed memorizing means of the microcomputer 24 (memorized car-speed), outputs the motor driving signal in response to the difference between said actual and memorized car-speeds into the driving means 25, and rotates the driving motor 15a of the actuator 15 in the opening or the closing direction of the throttle 14 in order to maintain the car-speed constant.

In the case of cancelling said automatic car-speed control, by operating the brake pedal the first switch 16a of the brake switch 16 linking with the brake pedal-operation moves into OFF-state(which is in ON-state normally), and the second switch 16b of the brake switch 16 moves into ON-state (which is in OFF-state normally).

Thereby, the cancelling signal is input in response to the ON-state of the second switch of said brake switch 16 into the microcomputer 24 through the interface circuit 23.

Namely, starting the automatic car-speed control, a program shown in FIG. 3 also works in the microcomputer 24. This program is so programmed as to determine whether the cancelling signal is input or not at step 101. When the cancelling signal is input to the microcomputer 24, said microcomputer 24 determines that the cancelling signal is input to the step 101 (YES) and resets the returning time T("0") of the throttle 14 at the step 102, and makes the electro-magnetic clutch 15b of the actuator 15 into unexcited state by cutting off the power supply to said electromagnetic clutch 15b through the exciting circuit 26 and a count of the returning time T is started. Furthermore, the driving motor 15a is driven in the returning direction (that is the closing direction of the throttle 14) through the driving circuit 25 at step 104.

At step 105, the microcomputer 24 determines whether or not the throttle 14 arrives in the full-closed position by sensing whether or not the limit switch 15d becomes into OFF-state. In the case of sensing the limit switch 15d to be in the OFF-state (YES), said microcomputer 24 determines whether or not the returning time T of the throttle 14 does not exceed the normal returning time $T_1$ at step 106.

Namely, in case the electromagnetic connection of the electromagnetic clutch 15b is released normally, as shown in FIG. 4, the throttle 14 is returned to the full-closed position by a return spring in the actuator 15 and said limit switch 15d becomes into OFF-state within the normal returning time $T_1$ even if the throttle 14 is in the full-opened position. However, when the electromagnetic connection of said electromagnetic clutch 15b cannot be released for some reason, the throttle 14 is returned compulsorily to the full-closed position for a time $T_2$ by the returning drive of the driving motor 15a at step 104 in case the throttle 14 is in the fully opened position.

Therefore if the returning time T exceeds the normal returning time T at step 106 (NO), the microcomputer 24 determines that there is abnormality in the electromagnetic clutch 15b, and prohibits the actuator 15 from working and maintains the actuator 15 in the non-working state.

When the returning time T does not exceed the normal returning time T at step 106 (YES), the microcomputer 24 determines that the electromagnetic clutch 15b functions normally and proceeds to the other program.

Additionally, in case the cancelling signal is not input at said step 101 (NO), the microcompouter 24 proceeds to the other program.

Accordingly, cancelling the automatic car-speed control by operating the brake pedal or the like, the actuator 15 is enabled to confirm the working of the electromagnetic clutch 15b of said actuator 15.

As described above, the automatic car-speed controller according to this invention has a car-speed sensor for outputting operating data proportional to an actual car-speed, a command switch for outputting a cruise command signal, a car-speed memorizing means for memorizing the operating data of said car-speed sensor in response to an operation of said command switch, an actuator for opening and closing a throttle by rotation of a driving motor through an electromagnetic clutch, and for stopping said driving motor when a limit switch senses said throttle in the fully opened position or the fully closed position, a driving means for rotating the driving motor of said actuator in the forward and reverse directions, an abnormal detection means for making said electromagnetic clutch into unexcited state and returning said driving motor of the atcuator to the fully closed position of the throttle at the time of cancelling an automatic car-speed control. and for detecting whether said electromagnetic clutch is normal or not by detecting the time required for returning said throttle to the fully closed position using said limit switch to sense the throttle in the fully closed position, and a control means for giving a command to said driving means corresponding to a difference between actual car-speed and memorized car-speed, and for making said actuator into unoperated state when said abnormal detection means detects abnormality in said electromagnetic clutch. Therefore, it is possible to cancel the actuator rapidly and to find the abnormality in the electromagnetic clutch in its early stages because the abnormality of the actuator is detected by making the electromagnetic clutch into unexcited state at the time of cancelling the automatic car-speed control. Consequently, excellent effects are obtained since it is possible to prevent the automatic car-speed control from using a defective actuator and thereby improve the reliability of the system.

What is claimed is:

1. A speed control system for a vehicle having a vehicle throttle means comprising:
a speed sensor producing a pulse train, the frequency of which is related to present vehicle speed;
an operator actuable command switch for establishing a cruising operation;
actuator means having a motor rotatable in forward and reverse directions and an electromagnetic clutch for transmitting the rotation torque of said motor to the vehicle throttle means;
a driving circuit for driving said motor of said actuator means;

controlling means connected to said speed sensor, said command switch, said actuator means and said driving circuit, said controlling means controlling said actuator means through said driving circuit corresponding to the operation mode selected by said command switch and to the frequency of the pulse train from said speed sensor;

an exciting circuit connected between said controlling means and said electromagnetic clutch of said actuator means for exciting said electromagnetic clutch; and a cancel switch means connected to said controlling means and said exciting circuit, said cancel switch means producing a cancelling signal to deenergize said electromagnetic clutch of said actuator means;

wherein said controlling means includes abnormality detecting means for detecting an abnormality in said electromagnetic clutch of said actuator means; and prevent means for preventing the energization of said electromagnetic clutch of said actuator means, which prevents the working of said actuator means, when said abnormality detecting means detects an abnormality in said electromagnetic clutch of said actuator means.

2. A speed control system of claim 1, in which said abnormality detecting means of said controlling means has a timer which times the return time of said electromagnetic clutch of said actuator means after a cancelling signal from said cancel switch means is supplied to said controlling means and said prevent means prevents the working of said electromagnetic clutch of said actuator means if the returnign time of said electromagnetic clutch of said actuator means exceeds a predetermined time.

3. A speed control system for a vehicle having a vehicle throttle means comprising:

a speed sensor producing a pulse train, the frequency of which is related to present vehicle speed;

an operator actuable command switch for establishing a cruising operation;

actuator means having a motor rotatable in forward and reverse directions, an electromagnetic clutch for transmitting the rotating torque of said motor to the vehicle throttle means, and a limit position detecting switch means connected to said motor for stopping the current flow through said motor when the vehicle throttle means arrives at a fully-closed position;

a driving circuit for driving said motor of said actuator means;

controlling means connected to said speed sensor, said command switch, said actuator means and said driving circuit, said controlling means controlling said actuator means through said driving circuit corresponding to the operation mode selected by said command switch and to the frequency of the pulse train from said speed sensor;

an exciting circuit connected between said controlling means and said electromagnetic clutch of said actuator means for exciting said electromagnetic clutch; and a cancel switch means connected to said controlling means and said exciting circuit, said cancel switch means producing a cancelling signal to deenergize said electromagnetic clutch of said actuator means;

wherein said controlling means includes abnormality detecting means for detecting an abnormality in said electromagnetic clutch of said actuator means; and prevent means for preventing the working of said electromagnetic clutch of said actuator means, which prevents the working of said actuator means when said abnormality detecting means detects an abnormality of said electromagnetic clutch of said actuator means.

4. A speed control system of claim 3, in which said abnormality detecting means of said controlling means has a timer which times the return time of said electromagnetic clutch of said actuator means after the cancelling signal from said cancel switch means is supplied to said controlling means, until said limit position detecting switch means detects that the vehicle throttle means arrives at the fully-closed limit position and said prevent means prohibits the working of said electromagnetic clutch of said actuator means if the returning time of said electromagnetic clutch of said actuator means exceeds a predetermined time.

* * * * *